United States Patent
Hui et al.

(10) Patent No.: US 9,996,993 B2
(45) Date of Patent: Jun. 12, 2018

(54) SYSTEM FOR CONSTRUCTING STOPPED VEHICLE-INFRASTRUCTURE COMMUNICATION NETWORK

(71) Applicant: DEUTSCHE TELEKOM AG, Bonn (DE)

(72) Inventors: Pan Hui, Kowloon (CN); Ting Wu, Kowloon (CN); Christoph Peylo, Damme (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days. days.

(21) Appl. No.: 15/126,295

(22) PCT Filed: Mar. 9, 2015

(86) PCT No.: PCT/EP2015/054849
§ 371 (c)(1),
(2) Date: Sep. 15, 2016

(87) PCT Pub. No.: WO2015/139991
PCT Pub. Date: Sep. 24, 2015

(65) Prior Publication Data
US 2017/0084096 A1    Mar. 23, 2017

(30) Foreign Application Priority Data
Mar. 19, 2014  (EP) .................................... 14160658

(51) Int. Cl.
*G07C 5/08*       (2006.01)
*G08G 1/01*       (2006.01)
(Continued)

(52) U.S. Cl.
CPC ......... *G07C 5/0841* (2013.01); *G06F 9/5044* (2013.01); *G08G 1/0112* (2013.01);
(Continued)

(58) Field of Classification Search
CPC ...... G08G 1/0112; G08G 1/147; G08G 1/166; G08G 1/143; G06Q 50/30; H04L 9/321;
(Continued)

(56) References Cited

U.S. PATENT DOCUMENTS 4,394,727 A    7/1983  Hoffman et al.
7,515,899 B1   4/2009  Carr et al.
(Continued)

FOREIGN PATENT DOCUMENTS

WO   WO 2012076012 A1   6/2012
WO   WO 2015139991 A1   9/2015

*Primary Examiner* — Yuri Kan
(74) *Attorney, Agent, or Firm* — Leydig, Voit & Mayer, Ltd.

(57) ABSTRACT

A method for utilizing the computing and/or storage resources of at least one parked vehicle includes recognizing the presence of at least one parked vehicle; establishing a network connection between at least one vehicle communication device of the at least one parked vehicle and at least one server; collecting information from the at least one parked vehicle; dispatching at least one task to the at least one vehicle communication device, wherein the at least one dispatched task comprises at least one of a computational task and a storing task; and performing the at least one dispatched task.

20 Claims, 7 Drawing Sheets

(51) Int. Cl.
   *G06F 9/50*     (2006.01)
   *H04L 29/08*    (2006.01)
   *H04W 4/04*     (2009.01)
(52) U.S. Cl.
   CPC .......... *G08G 1/0133* (2013.01); *H04L 67/10* (2013.01); *H04L 67/12* (2013.01); *H04W 4/046* (2013.01); *Y02D 10/22* (2018.01)
(58) Field of Classification Search
   CPC ... G07C 5/008; H04W 74/04; G05B 19/4189; G06K 9/00825; B60R 25/34; G01C 21/26
   See application file for complete search history.

(56) References Cited

U.S. PATENT DOCUMENTS

| | | | |
|---|---|---|---|
| 2004/0128062 A1* | 7/2004 | Ogino | G01C 21/26 701/400 |
| 2012/0034876 A1* | 2/2012 | Nakamura | H04L 9/321 455/66.1 |
| 2012/0044091 A1 | 2/2012 | Kim et al. | |
| 2012/0123614 A1* | 5/2012 | Laws | G05B 19/4189 701/2 |
| 2014/0129061 A1* | 5/2014 | Cooper | H04W 74/04 701/19 |
| 2014/0180563 A1* | 6/2014 | Simon | G08G 1/166 701/118 |
| 2015/0039211 A1* | 2/2015 | Stefan | G08G 1/143 701/117 |
| 2015/0124096 A1* | 5/2015 | Koravadi | G06K 9/00825 348/148 |
| 2015/0161890 A1* | 6/2015 | Huntzicker | G08G 1/147 340/932.2 |
| 2015/0178640 A1* | 6/2015 | Balakrishnan | G06Q 50/30 705/13 |
| 2015/0321640 A1* | 11/2015 | Hisada | B60R 25/34 340/426.2 |
| 2016/0019729 A1* | 1/2016 | Rufo Torres | G07C 5/008 701/31.5 |

\* cited by examiner

SYSTEM FOR CONSTRUCTING STOPPED VEHICLE-INFRASTRUCTURE COMMUNICATION NETWORK

CROSS REFERENCE TO RELATED APPLICATIONS

This application is a U.S. National Phase application under 35 U.S.C. § 371 of International Application No. PCT/EP2015/054849, filed on Mar. 9, 2015, and claims benefit to European Patent Application No. EP 14160658.2, filed Mar. 19, 2014. The international application was published in English on Sep. 24, 2015, as WO 2015/139991 A1 under PCT Article 21(2).

FIELD

In general the invention relates to networked vehicles to an infrastructure communication system and the arrangement of vehicular communication automation, vehicular networking and wireless communication systems and a system and method for autonomously organizing regional stopped cars to communicate with the infrastructure. More specifically, the invention relates to a method for utilizing the computing and/or storage resources of at least one parked vehicle and to a method for providing computing and/or storage resources of at least one parked vehicle. The invention further relates to a vehicle communication device for providing computing and/or storage resources of at least one parked vehicle and to a system for utilizing the computing and/or storage resources of at least one parked vehicle.

BACKGROUND

The past decade has witnessed a growing trend to make the vehicles on the roads smarter and offer better driving experience. Equipped with on-board computer, wireless devices (e.g. radio transceiver, sensing devices) and rechargeable battery, a typical car or truck is likely able to interact with the Internet and associated services. As technology is moving closer and closer to embedding sophisticated resources in individual vehicles, it is fair to assume in the near future even the low-end vehicles will be coupled with on-board wireless communication devices and data collection devices. WO 2012/076012 describes a distributed computing system using the idle processing power of wind turbines.

The initial views of leveraging vehicular networking systems were to keep the drivers informed about potential safety risks and enhance their awareness of traffic condition. However, the huge array of on-board capacities is not likely fully utilized, because the content delivery efficiency is bounded by the fleeting and dynamic connectivity between moving vehicles. Compared with moving vehicles, their stopped counterparts show great advantages in communication.

SUMMARY

In an embodiment, the present invention provides a method for utilizing the computing and/or storage resources of at least one parked vehicle. The method includes recognizing the presence of at least one parked vehicle; establishing a network connection between at least one vehicle communication device of the at least one parked vehicle and at least one server; collecting information from the at least one parked vehicle; dispatching at least one task to the at least one vehicle communication device, wherein the at least one dispatched task comprises at least one of a computational task and a storing task; and performing the at least one dispatched task.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In various embodiment, the present invention provides a method for utilizing the computing and/or storage resources of at least one parked vehicle, a method for providing computing and/or storage resources of at least one parked vehicle, a vehicle communication device for providing computing and/or storage resources of at least one parked vehicle, and a system for utilizing the computing and/or storage resources of at least one parked vehicle.

An embodiment of the invention provides a system which collects the information carried by the parked vehicles along its trajectory, e.g. traffic condition, weather condition, emergencies etc. The system can also provide computation and instant storage service for nearby communities.

A system according to an embodiment of the invention can be defined in five distinct phases: vehicle recognition, connection establishment, data collection, task dispatching, and disconnection remedy. Corresponding to the first phase, there can be three statuses of the vehicles within the system which perform as triggers of events: entering, staying and leaving. To capture these three statuses, a sensor can be embedded in an edge device. When a vehicle is captured by the system, the communication module of the edge device can send one or more beacon messages to establish a connection between at least one server and the at least one vehicle. Regarding security issues, an authentication can be set up after the establishment of the connection. After that, the system can ask the vehicle for data submission, which aims at collecting the information sensed by the vehicles along its travelling trajectory before parking. The task dispatching can be executed when a vehicle is available to release its computation and storage resource. If any vehicle leaves/disconnects with the system, the disconnection remedy mechanism can retrieve the information and can reschedule the tasks to other available vehicles. By combining the behaviors and features of extensive urban parking, the computing and storage resources of parked vehicles can be utilized. Since the parked vehicles at cities are abundant, ubiquitous and credible sources, this invention is particularly applicable to urban areas.

An embodiment of the invention provides a method for utilizing the computing and/or storage resources of at least one parked vehicle comprising the steps of: recognizing the presence of at least one parked vehicle; establishing a network connection between at least one vehicle communication device of the at least one parked vehicle and at least one server, preferably via at least one external edge device; collecting information from the at least one parked vehicle; dispatching at least one task to the at least one vehicle communication device, and performing the dispatched task.

According to an embodiment of the invention, the method for utilizing the computing and/or storage resources of at least one parked vehicle can further comprise the step of: obtaining information on and/or determining the capability of the at least one vehicle communication device to perform the at least one dispatched task. Preferably, the capability is not constant and may depend on the computational power and/or storage power of the at least one vehicle. The task comprises at least one computational task and/or at least one storing task. The capability may comprise information on the current computational power and/or storage power, i.e. the capability of a computation module and/or of storage of a vehicle to perform a requested task.

According to another embodiment of the invention, the method for utilizing the computing and/or storage resources of at least one parked vehicle further comprises the step of: obtaining the result of performing the at least one dispatched task from the at least one vehicle communication device.

According to another embodiment of the invention, the method for utilizing the computing and/or storage resources of at least one parked vehicle further comprises the steps of: recognizing when the at least one parked vehicle is leaving its parking position; and retrieving the result of performing the at least one dispatched task from the at least one vehicle communication device and/or collecting the information before the at least one parked vehicle is leaving its parking position.

According to another embodiment of the invention, the method for utilizing the computing and/or storage resources of at least one parked vehicle further comprises the steps of: determining whether the at least one dispatched task is completely performed by the at least one vehicle communication device; and redispatching the rest of the at least one dispatched task to at least one other vehicle communication device of another vehicle in case that it is determined that the at least one dispatched task is not completely performed from the at least one vehicle communication device. In case that it is determined that the at least one dispatched task is not performed from the at least one vehicle communication device and/or is not retrieved from the at least one vehicle communication device, the whole task can be redispatched to at least one other vehicle communication device of another vehicle.

According to another embodiment of the invention, the method for utilizing the computing and/or storage resources of at least one parked vehicle further comprises the step of: authenticating the at least one parked vehicle and/or establishing a secure session for the data transfer between the at least one parked vehicle and the at least one server.

According to another embodiment of the invention, the method for utilizing the computing and/or storage resources of at least one parked vehicle further comprises the step of: dividing/slicing the at least one task into a plurality of sub-tasks and dispatching the at least one task as a plurality of sub-tasks to the at least one vehicle communication device.

According to another embodiment of the invention, the presence of the at least one parked vehicle is recognized by sensing whether the parked vehicle is parked on a parking position.

In an embodiment, the invention provides a method for providing computing and/or storage resources of at least one parked vehicle comprising the steps of: providing information from the at least one parked vehicle to at least one server, via a network connection between at least one vehicle communication device of the at least one parked vehicle and the at least one server, preferably via at least one edge device; receiving at least one dispatched task from the at least one server; performing the at least one dispatched task from the at least one vehicle communication device.

According to an embodiment of the invention, the method for providing computing and/or storage resources of at least one parked vehicle further comprises the steps of: sending information on the capability of the at least one vehicle communication device to perform the at least one dispatched task to the at least one external edge device.

According to another embodiment of the invention, the method for providing computing and/or storage resources of at least one parked vehicle further comprises the step of: sending the result of performing the at least one dispatched task from the at least one vehicle communication device to the at least one external edge device.

According to another embodiment of the invention, the method for providing computing and/or storage resources of at least one parked vehicle further comprises the step of: sending authenticating information on the at least one parked vehicle to the at least one external edge device.

According to another embodiment of the invention, the information comprises information gathered by the at least one vehicle along its trajectory, in particular traffic condition, whether conditions and/or information on emergencies; and/or wherein the information comprises information on the power status and/or the power consumption of the at least one vehicle; and/or the information comprises collected data from at least one onboard sensor of the at least one vehicle.

An embodiment of the invention provides a vehicle communication device for providing computing and/or storage resources of at least one parked vehicle comprising: a control unit and a processing unit, wherein the control unit comprises a network manager configured to provide a network connection between the vehicle communication device and at least one server, preferably via at least one external edge device, the network manager being further configured to receive at least one dispatched task from the at least one edge device and being configured to provide information from the at least one parked vehicle to at least one edge device via the network connection, and wherein the processing unit comprises a computation module and/or a storage configured to perform the at least one dispatched task, wherein the storage is further configured to store the information to be provided to the at least one external edge device.

According to an embodiment of the invention, the control unit further comprises a power manager configured to provide information on the power status and/or the power consumption of the at least one vehicle to the at least one external edge device via the network manager.

According to another embodiment of the invention, the power manager is configured to send a request to the at least one server to terminate the connection when the power of the at least one vehicle is below a predetermined threshold.

According to another embodiment of the invention, the power manager is configured to terminate the connection when the power of the at least one vehicle is below a predetermined threshold.

According to another embodiment of the invention, the control unit is further configured to provide information on the capability of the vehicle communication device to perform the at least one dispatched task to the at least one server.

According to another embodiment of the invention, the computational unit is configured to provide the result of performing the at least one dispatched task to the at least one external edge device via the network manager.

According to another embodiment of the invention, the control unit further comprises an authentification module configured to provide authenticating information on the vehicle to the at least one server via the network manager.

According to another embodiment of the invention, the processing unit is configured to gather data from at least one power detector of the vehicle and is further configured to determine the power status and/or the power consumption of the vehicle and is further configured to determine whether the power of the vehicle is above a predetermined threshold. Preferably, the gathered data is updated to the at least one server when a corresponding connection is established.

According to another embodiment of the invention, the processing unit is configured to gather data from at least one onboard sensor of the vehicle and is further configured to store the gathered data as information in the storage.

According to another embodiment of the invention, the vehicle communication device further comprises a user interface configured to handle communication between as user.

According to another embodiment of the invention, the control unit is further configured to display at least one information, in particular on joining a network and/or on authentificating for a network.

According to another embodiment of the invention, the user interface is configured to display at least one manipulation menu for the vehicle communication.

An embodiment of the invention provides a system for utilizing the computing and/or storage resources of at least one parked vehicle comprised in the system, comprising: an edge device configured to recognize the presence of at least one parked vehicle, the edge device comprising a network manager configured to establish a network connection between at least one vehicle communication device, preferably according to any of the preceeding embodiments, of the at least one parked vehicle and at least one edge device, the edge device being further configured to collect information from the at least one parked vehicle; and at least one server comprising a task dispatching unit configured to dispatch at least one task to the at least one vehicle communication device.

According to an embodiment of the invention, the at least one server is further configured to obtain information on and/or determine the capability of the at least one vehicle communication device to perform the at least one dispatched task.

According to another embodiment of the invention, the edge device is further configured to recognize when the at least one parked vehicle is leaving its parking position and is configured to retrieve the result of performing the at least one dispatched task from the at least one vehicle communication device and/or is configured to collect the information before the at least one parked vehicle is leaving its parking position.

According to another embodiment of the invention, the server is further configured to determine whether the at least one dispatched task is completely performed from the at least one vehicle communication device, and is further configured to redispatch the rest of the at least one dispatched task to at least one other vehicle communication device in case that it is determined that the at least one dispatched task is not completely performed from the at least one vehicle communication device. In case that it is determined that the at least one dispatched task is not performed from the at least one vehicle communication device and/or is not retrieved from the at least one vehicle communication device, the server is further configured to redispatch the whole task to at least one other vehicle communication device of another vehicle.

According to another embodiment of the invention, the task dispatching unit is configured to divide the at least one task into a plurality of sub-tasks and is configured to dispatch the at least one task as a plurality of sub-tasks to at least one vehicle communication device. Preferably, the at least one task is dispatched based on the current computational and/or storage power of the at least one vehicle.

According to another embodiment of the invention, the edge device further comprises a sensor wherein the sensor is configured to recognize said presence of at least one parked vehicle by sensing whether the parked vehicle is parked on a parking position and/or by obtaining an presence signal of the at least one parked vehicle. Preferably, the presence signal is a beacon message or beacon signal.

According to another embodiment of the invention, the edge device is further configured to obtain the result of performing the at least one dispatched task from the at least one vehicle communication device.

According to another embodiment of the invention, the server further comprises an authentification unit configured to authenticate the at least one parked vehicle and/or configured to establish a secure session for the data transfer between the at least one parked vehicle and at least one edge device.

According to another embodiment of the invention, the server further comprises a routing unit configured to draw a network map and/or the information in routing table comprising at least one policy for outgoing and incoming packets in the network.

According to another embodiment of the invention, system for utilizing the computing and/or storage resources of at least one parked vehicle further comprises a base station database configured to store data for providing the functionality of the server and/or is configured to store data received by the system from the vehicle communication device and/or the edge device.

According to another embodiment of the invention, the at least one edge device is configured to initiate the network connection between the at least one server and the at least one vehicle communication device with a beacon signal.

According to one embodiment, the network comprises vehicles and a corresponding infrastructure, e.g. at least one edge device and at least one server. Preferably, the network is configured as a data center network that uses parked vehicles as nodes. Preferably, the communication within the infrastructure and from/to the at least one parked vehicle can be wired or wireless, and it may comprise a local area network, LAN, and/or a wide area network, WAN, e.g. the Internet. The communication infrastructure may also be coupled to or comprise telecommunication networks for sending data in a variety of different communication channels. For example, the network may comprise communication abilities with mobile devices by using 3G or 4G technologies.

Figure 1:
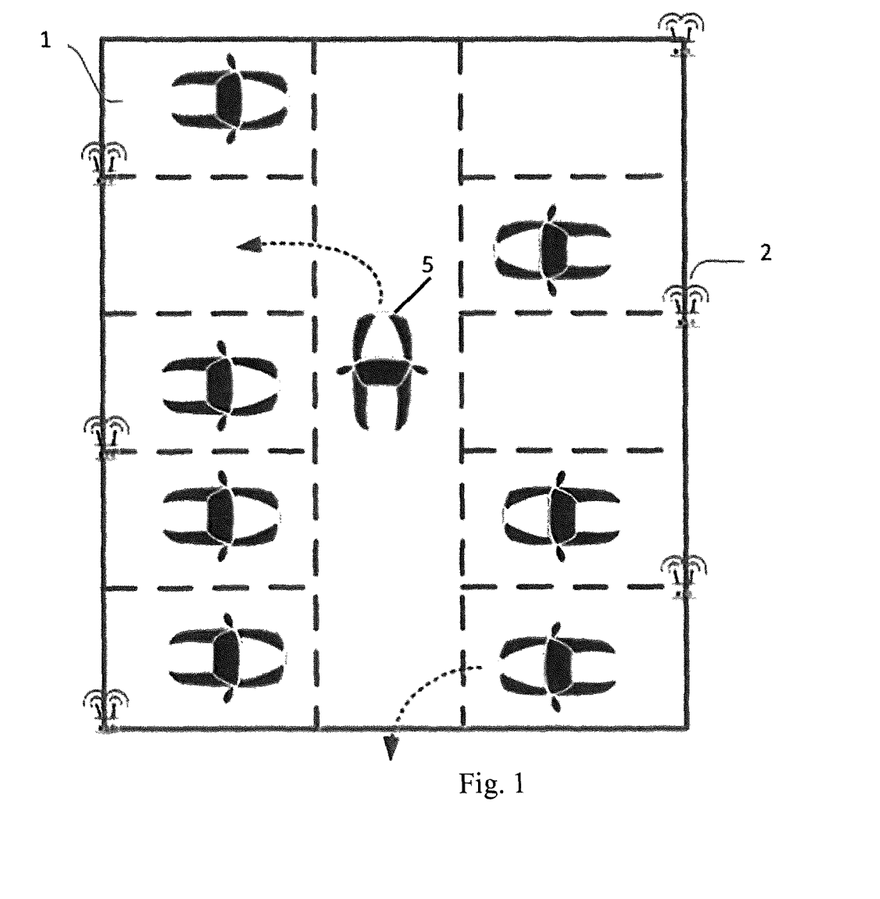
FIG. 1 shows a schematic diagram of a parking space according to an embodiment of the invention.

FIG. 1 shows a schematic diagram of a parking space 1, e.g. an indoor parking space, an outdoor parking space and/or roadside parking according to an embodiment of the invention. The parking space 1 herein refers to the space covering all parking slots within a system according to an embodiment and the parking slot herein refers to a limited space that can be utilized by only one vehicle 5. In this embodiment, the network comprises vehicles 5 and the corresponding infrastructure, e.g. edge devices 2, a server, and a base station database. The network according to this embodiment is configured as a data center network that uses the parked vehicles 5 as nodes. The communication within the infrastructure and from/to the at least one parked vehicle 5 can be wired or wireless, and it may comprise a local area network (LAN) and/or a wide area network (WAN), e.g. the Internet. The communication infrastructure may also be coupled to or comprise telecommunication networks for sending data in a variety of different communication channels. For example, the network may comprise communication abilities with mobile devices by using 3G or 4G technologies.

According to the embodiment of FIG. 1, an edge device 2 is deployed in every other parking slot to maximize the coverage of the edge devices 2 on one hand and considering the efficiency in an optimum way. The one or more edge devices 2 and the vehicles 5 communicate via a wireless communication channel. When a vehicle 5 drives into the parking space 1, the vehicle recognition mechanism is invoked while the vehicle 5 occupies a specific parking slot. During the time while the vehicle 5 is staying in the parking slot, the edge device 2 is in charge of maintaining the communication with the vehicle 5. When a vehicle 5 is leaving the parking slot, the edge device 2 sends the leaving notification to the server when it senses that the parking slot is no longer occupied.

Figure 2:
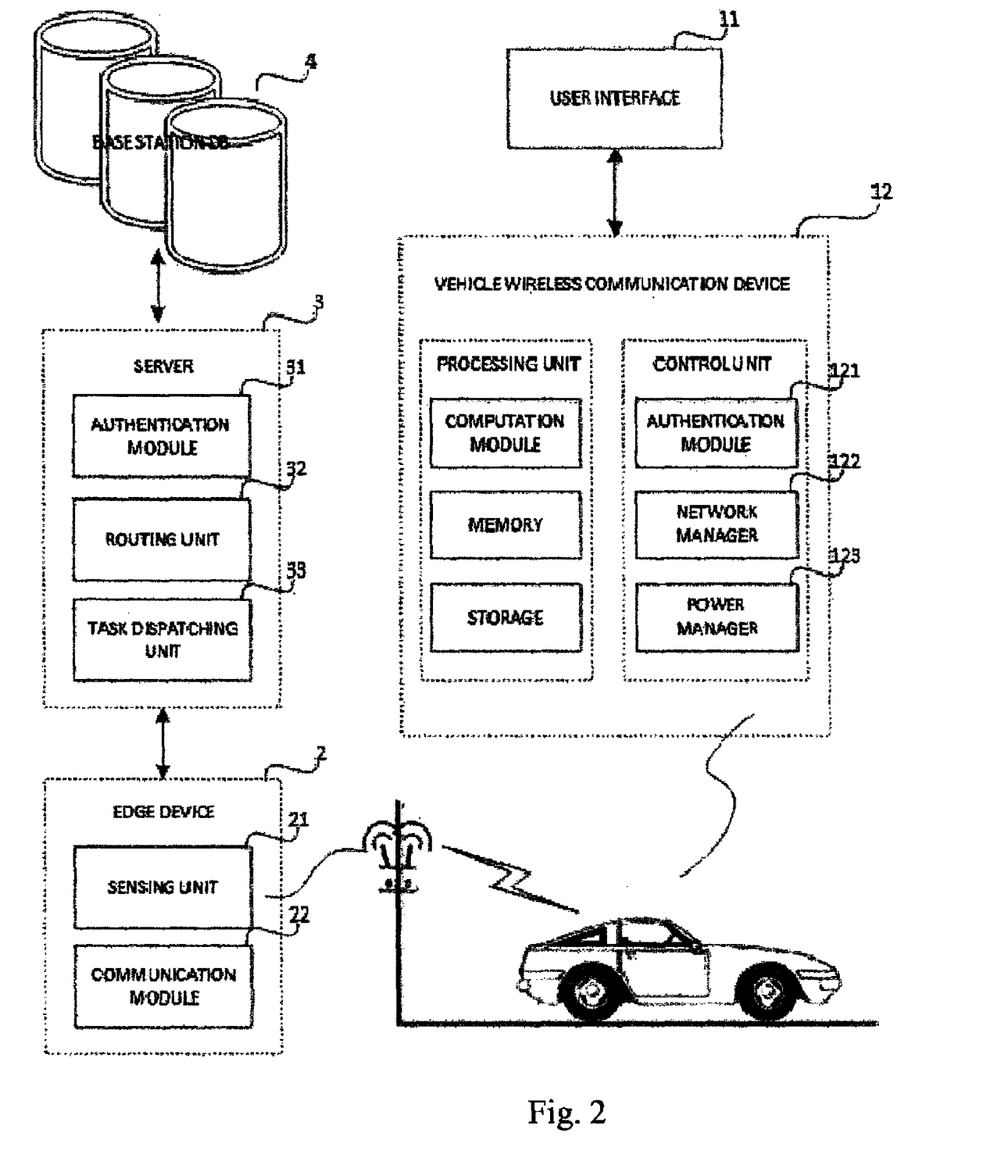
FIG. 2 shows a diagram of a basic model and components of a vehicle communication device for providing computing and/or storage resources of at least one parked vehicle and a system for utilizing the computing and/or storage resources of at least one parked vehicle according to an embodiment of the invention.

FIG. 2 shows a diagram of a basic model and components of a vehicle communication device for providing computing and/or storage resources of at least one parked vehicle and a system for utilizing the computing and/or storage resources of at least one parked vehicle 5 according to an embodiment of the invention. The vehicle communication device 12 can be wireless and is embedded in a vehicle 5, e.g. a car.

The vehicle communication device 12 includes a control unit 12a and a processing unit 12b. The vehicle communication device 12 is configured as a microcomputer comprising a central processing unit, CPU, a random-access-memory, RAM, a read-only-memory, ROM, and an input/output interface. The control unit 12a comprises an authentication module 121, a network manager 122 and a power manager 123. The processing unit 12b comprises a computation module 124, a memory 125 and storage 126. Although there are only one control unit 12a and one processing unit 12b shown in FIG. 2, the skilled person can recognize that the vehicle wireless communication device 12 can include any number of control unit 12a and processing unit 12b. In this embodiment, the communication is also presented as wireless communication. However, the skilled person recognizes that the communication device that is comprised in vehicles 5 may relay on a wired communication channel.

The control unit 12a, in accordance with the aforementioned three statuses of a vehicle 5 within the system—entering, staying and leaving the parking slot—the system controls all connection establishment, maintenance, and termination. The control unit 12a communicates with the server 3 for the purpose of vehicle authentication. It also monitors the current power level of the vehicle 5 by acquiring information from embedded sensor. Control unit 12a performs various processes, based on information provided by the user interface 11, the edge device 2 and the processing unit 12b.

The authentication module 121 processes the conversation initiated by the authentication module 31, which is according to this embodiment embedded in server 3. As will be described later, for the first time when a vehicle 5 joins the system for utilizing the computing and/or storage resources, it sends a request to the server 3 via the edge device to get an initial authentication information (e.g. user ID, initial password) and stores it in storage 126. This process may involve human intervention.

After that, each time for the purpose of vehicle authentication, the authentification module 121 can retrieve information from the storage 126, which comprises the user's ID, password, statues, etc. After obtaining said credential information, the authentification module 121 submits the result to the server 3 immediately without relying on any human intervention.

The network manager 122 is in charge of setting up a connection with the one or more edges devices 2 and may terminate the connection based on the requirement from the user interface 11 connected to the vehicle communication device or the power manager 123. The network manager 122 can also acquire information about current network condition, including the network connection, traffic volume, ongoing network protocols etc. The network manager 122 may be preconfigured by a computer program for the purpose of controlling the communication between the vehicle 5 and the infrastructure. For example, the vehicle 5 can be configured to communicate with the edge device 2 with the strongest signal. Alternatively, the network manager 122 can also choose the edge device 2 that connects to the fewest vehicles 5. All these information acquired by network manager 122 may also be displayed on a user interface 11 connected to the vehicle communication device 12.

Moreover, with respect to the power manager 123, information of the remaining power that may be detected by an embedded power condition sensor (not shown) can be provided. Based on said feedback of the current power condition of the vehicle 5, the power manager 123 is configured to perform various processes. For example, when the vehicle 5 drops into a low power level, the power manager 123 may send a notification to the network manger 122 for terminating the interaction with the infrastructure. A customized threshold can be set to avoid the vehicle 5 is totally run out of power. All these information acquired by power manager 123 may also be displayed on the user interface 11. In this embodiment, the power supply device is not illustrated in the figure. It can be of a conventional type or deployed based on the requirement of the specific environmental situation.

The processing unit 12b can be any processor-based computing device. For example, the processing unit 12b can be a central processing unit (CPU) implemented in a vehicle 5. It can integrate the computation module 124, the memory 125 and the storage 126. In one embodiment, the processing unit is configured to receive one or more tasks from the edge device 2 and one or more signals from control unit 12a.

The computation module 124 can be an embedded as a general arithmetic logic unit in the vehicle 5 for analyzing the road status and the collision calculation, entertainment, etc. In one embodiment, the computation module 124 can be implemented as an AMD/Intel core, ARM Core or micro control unit. The computational module 124 can be configured to receive computation tasks from the server 3 and can be controlled by the control unit 12a. For example, if the power manager 123 indicates the power level of the vehicle 5 is below a pre-determined threshold, the computation tasks may be terminated. The outcome of the computation module 124 can be stored in a storage 126 or can be send back to the server 3.

The memory 125 can be a non-transitory, i.e. non-volatile, memory that is configured to store data. For example, the memory 125 can be a dynamic access memory (DRAM) device, a static random access memory (SRAM) device, flash memory or some other memory device known in the art. The memory 125 can be configured to provide a faster workspace for the computation module 124 which interacts with the computation module 124 and exchanges information with the at least one server 3 via the at least one edge device 2.

The storage 126 can store the information collected by a variety of onboard sensors (not shown) embedded in vehicle 5, for example, a GPS unit, a geomagnetic sensor and a gyroscope. As will be described in detail, the storage 126 is configured to acquire information supplied from said sensors to not only give a better appreciation to the current condition of the city, but also yield further insight for providing service to nearby communities. The storage 126 can also store a computer program to control the vehicle communication device 12 and various data. In one embodiment, the storage 126 can be implemented as solid-state disk (SSD), floppy disk drive, hard disk drive (HDD) or some other non-volatile storage device known in the art.

The user interface 11 can be one or more liquid-crystal display units or an organic EL display unit, for example. It is configured to handle communications between the user and the control unit 12a. The user interface 11 can send the input from the user to the control unit 12a. In one embodiment, the user interface 11 is configured to display various information such as the notification of joining a new network and/or system for utilizing the computing and/or storage resources and can comprise manipulation menus for the vehicle communication device 12 or the guidance of internal system configuration. As will be described in detail, the user interface 11 can ask for a password before the server 3 starts acquiring data from the vehicle wireless communication device 12.

The edge device 2 is configured to initiate and maintain the communication between the vehicle wireless communication device 12 and server 3. It comprises a sensor 21 and a communication module 22. Although there are only one sensor 21 and one communication module 22 shown in FIG. 2, the skilled person can recognize that the edge device 2 can include any number of sensor 21 and communication module 22. These two components may be implemented in different physical locations. In one embodiment, the edge device 2 is deployed on the wall of the parking space 1 except the sensor 21 of the edge device 2, which is deployed on the floor.

The sensor 21 can be of any type of conventional sensor configured to collect data of the vehicle status. In one embodiment, the sensor 21 comprises a combination of different sensors. For example, the sensor 21 is one of the following: a light detector, temperature detector, and a sound detector, etc. The skilled person will recognize that also other types of sensors are possible. In one embodiment, the sensor, which can be a light detector, is deployed on the center of the parking slot and measures a condition of the light. The sensor 21 then generates a respective sensor signal. For example, when the light condition detected by the sensor 21 switches from strong to weak, it indicates that there is a vehicle 5 entering the parking slot. As will be described later, the sensor signal can trigger the communication module 22 for initiating/establishing the connection between communication module 22 and vehicle communication device 12. Similarly, the communication module 22 can also be configured to send a notification to the at least one server/the infrastructure when a vehicle 5 is leaving the parking slot.

The communication module 22 can comprise, among others, devices that are configured to connect the vehicle communication device 12 and the server 3 so as to be capable of data communication. According to one embodiment, the communication module 22 can comprise a wireless access point, WAP, that is configured to connect the vehicle communication device 12 with a wired network via Wi-Fi, or any related standard. The server 3 can perform various data communications with the vehicle communication module 12 via the communication module 22. The communication module 22 is configured to acquire the content delivered from the server 3 via a respective communication line network.

The server 3 can comprise software means and suitable computer hardware means so that the server 3 is configured to respond to requests across the whole network. The server 3 can comprise an authentication module 31, a routing unit 32 and task dispatching unit 33. Although there are only one authentication module 31, one routing unit 32 and one task dispatching unit depicted in FIG. 2, the skilled person can recognize that the server 3 can include any number of authentication module 31, routing unit 32 and task dispatching unit 33. In one embodiment, the server 3 connects with multiple edge devices 2 so as to be capable of corresponding data communication. The server 3 acquires information from the vehicle communication device 12. In another embodiment, the server 3 operates within a client-server architecture, i.e. a computer program is running on the server 3 on request of other programs. Thus, the server 3 performs some tasks on behalf of clients.

The authentication module 31 is configured to provide the network service that applications use to authenticate the credentials, particularly the ID and the passwords of the vehicles 5. As will be described later, when the authentication module 121 of vehicle wireless communication device 12 submits a valid set of credentials, the authentification module 121 receives a cryptographic ticket from the server 3 that can subsequently be used to access various datasets and services.

The routing unit 32 is a control plane that is the part of a router architecture that is concerned with drawing a network map, or the information in a, possibly augmented, routing table that defines the application of the incoming packets. The functions of the routing unit 32, e.g. the participating in routing protocols, can run in an architectural control element. In most cases, the routing table comprises a list of destination addresses and the outgoing interface(s) associated with them. In one embodiment, the logics of the routing unit 32 can also define certain packets to be discarded, as well as preferential treatment of certain packets for which a high quality of service is defined by such mechanisms as differentiated services.

The task dispatching unit 33 can use methods which are known from computer networking for distributing workloads across multiple computing resources, such as control unit 12a, processing unit 12b, network links, sensor 21 or communication module 22. As will be described later, the tasking dispatching unit 33 aims to optimize resource use, maximize throughput, minimize response time, and avoid overload of any one of the resources. Said task dispatching methods in computer networking are well known for the skilled person and can be found in U.S. Pat. No. 4,394,727 A for example. In one embodiment, the task-dispatching unit 33 uses multiple components with load balancing instead of a single component to increase reliability through redundancy. In one embodiment, tasking dispatching unit 33 is implemented by a dedicated software or hardware, such as a multilayer switch or a domain name system (DNS) server process.

The base station database 4 is an online database accessible from the server 3. For example, the base station database 4 is a database where data is stored on multiple virtual servers, possibly hosted by different organizations and/or owners. In one embodiment, the base station database 4 stores any data for providing the functionality of the server 3. In another embodiment, the base station database 4 stores data received from the vehicle communication device 12 and from the edge device 2. The server 3 can use the base station database 4 to store the content information about one or more vehicles 5. The base station database 4 also can be configured to store the content information from more than one parking space 1 regardless of regions or cites of the parking spaces 1.

The system for utilizing the computing and/or storage resources can also comprise at least one charging device to supply the one or more vehicle 5 with power, while the vehicle 5 is performing the computation tasks. In one embodiment, the vehicle 5 is connected to a power grid through standard socket-outlets present in residences, which depending on the country are usually rated at around 10 A. The sockets can comprise blanking devices to prevent accidental contacts. In another embodiment, the vehicle 5 is connected directly to a electrical network via specific a socket and a plug and a dedicated circuit. A control and protection function can also be installed permanently in the installation.

Referring now to FIG. 3-7, various embodiments of a method according to embodiments of the invention will be described.

Figure 3:
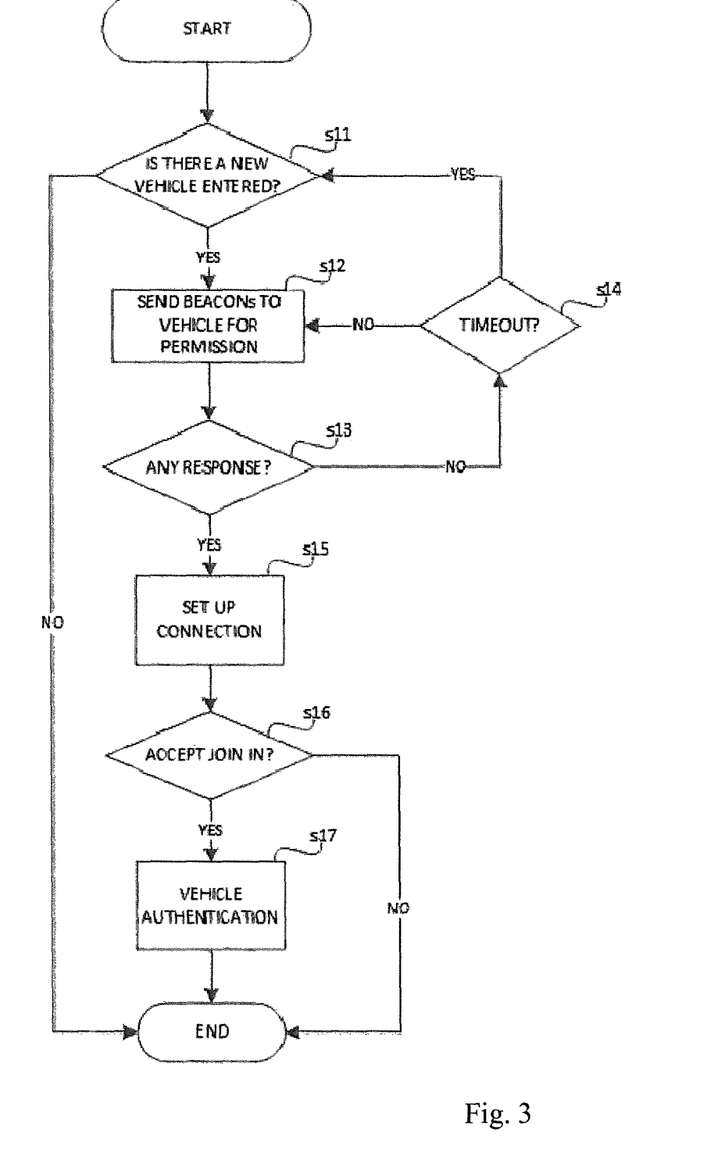
FIG. 3 shows a schematic flowchart diagram of a method for establishing a connection between at least one sever and at least one vehicle communication device according to an embodiment of the invention.

FIG. 3 shows a schematic flow diagram of a method for establishing a connection between at least one sever 3 and at least one vehicle communication device 12 according to an embodiment of the invention. The schematic flowchart diagram refer to details of the connection establishment performed by the infrastructure, i.e. both the server 3 and the edge device 2. When, for example, a sensor detects that a vehicle 5 is entering a parking slot, the process of the flowchart is started.

In step s11, it is determined whether there is any information acquired by the sensor 21 indicating that a vehicle 5 is entering a parking slot. For example, in one embodiment, the sensor 21 acquires information from a light detector. Based on the input threshold, the sensor send the respective information to the communication module 22. After it is determined that the light condition drops below the threshold, which indicates a vehicle 5 has entered the parking slot where the detector is located, the sensor 21 sends a notification message to the communication module 22 and the process proceeds to step s12. Otherwise, the process remains in step s11.

In step s12, after receiving the notification message from the sensor 21, the communication module 22 sends a beacon message to the vehicle 5 for establishing an initial connection. For example, in an embodiment, the communication module 22 is implemented with an Wi-Fi access point, which provides various types of beacon frames that 802.11 stations uses to support wireless data communication. Typically, the beacon frame is a type of management frame, providing the "heartbeat" of a wireless LAN, enabling stations to establish and maintain communications in an orderly fashion. After sending a complete beacon, the counter, a local variable, increases by 1 and the process proceeds to step s13. In one embodiment, the counter is set by default or by user configuration.

In step s13, it is determined whether there is any response from the vehicle 5. The communication module 22 of edge device 2 determines whether the vehicle 5 sends back any responses. If communication module 22 receives a response (step s13, YES), the process proceeds to step s15, and if not (step s13, NO), the process proceeds to step s14 which gives timeout. If there is no response within a pre-determined beacon interval, the process first checks whether the counter exceeds the threshold (may be configured as the requirement). If the counter exceeds the threshold, the process proceeds to step s11, if not, the process proceeds to step s12.

In step s15, for the purpose of setting up connections, one or more negotiation sessions are performed between the infrastructure, i.e. the edge device 2 and the server 3, and the vehicle 5 using any related standard. The negotiation may comprise the transmission rate, transmission frequency, MTU, etc. After the connection is established, the process proceeds to s16.

In step s16, it is determined whether the vehicle 5 accepts joining the network/system and providing computation service. In this step, the server 3 sends a request to the vehicle communication module 12 to get the permission of joining the system and providing computation service. This process may involve human intervention for the first time when a vehicle 5 joins a new network. The request will be displayed on the user interface 11 and the owner of the vehicle 5 may have the choice to determine whether to join or not. After the first setting which might be stored in storage 126, the vehicle wireless commutation module 12 might be able to automatically determine whether to join in or not. If the vehicle 5 accepts to join the network/system and provides computation service (step s16, YES), the process proceeds to step s17, if not (step s16, NO), the process proceeds to end. As will be described later, in step s17, the system performs the authentication mechanism.

Figure 4:
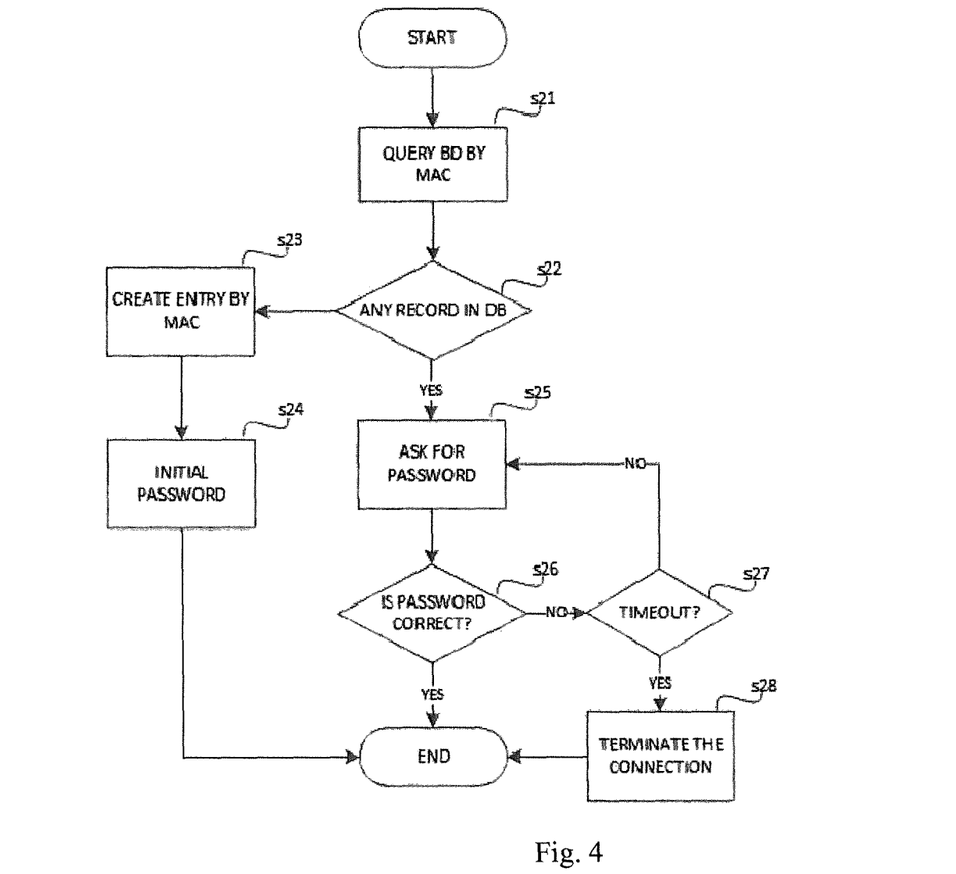
FIG. 4 shows a schematic flowchart diagram of an authentication mechanism of a system and/or method according to an embodiment of the invention.

FIG. 4 shows a schematic flowchart diagram of an authentication mechanism of a system and/or method according to an embodiment of the invention. In step s21, the process queries the base station database 4 for the media access control (MAC) address of the vehicle 5 to determine whether this vehicle 5 has been recorded before. The information comprises the MAC address of the vehicle 5 and is submitted by the authentication module 121 of the vehicle communication device 12. The authentication module 31 of server 3 retrieves the corresponding information from the base station database 4 and determines whether there is a matching between the MAC address of the vehicle 5 and one of the stored MAC addresses. Moreover, because every vehicle 5 has a unique MAC address, the MAC address can also be used to detect and track a specific vehicle 5.

In step s22, it is determined whether there are any records of the vehicle 5 with the respective MAC address. If there is a matching record of the vehicle 5 in the base station database 4 (step s22, YES), the process proceeds to step s25, and if not (step s22, NO), the process proceeds to s23.

In step s23, the authentication module 31 of server 3 creates an entry for a new joining vehicle 5, i.e. the vehicle 5 has no previous record in base station database 4, and set "MAC address" as the primary key.

After that, in step s24, the server 3 initiates a password for the vehicle 5. In one embodiment, this step comprises the mechanism of validating the identification of the vehicle 5 before generating an entry for the vehicle 5. The mechanism of validating the identification of the vehicle 5 can be processed manually or automatically. For example, every vehicle 5 that intends to join the system/network should first subscribe to a vehicle-infrastructure system on the Internet. Some of the necessary information may comprise the owner's identification, vehicle's identification, insurance, etc. The server 3 may not generate an entry in the base station database 4 to the vehicle 5 without subscription. All the information about such vehicle 5 will be further stored in the base station database 4. Then, the process proceeds to the end.

If the server 3 finds a matching record of the vehicle 5, in step s25, the server 3 further sends a request to the vehicle communication device 12 to get the password that is granted by the authentication module 31 of server 3. The control unit 12*a* acquires and submits the password from the storage 126 when it receives the request. Within one request, each time the vehicular wireless communication device submits a password, a counter, e.g. a local variable, increases by 1. In one embodiment, the counter is set by default or user configuration.

In step s26, it is determined whether the password submitted by the control unit 12*a* is correct. If the password is correct, the process proceeds to the end. If not, the process proceeds to step s27.

In step s27, it is determined whether the counter exceeds a predetermined threshold. If the counter exceeds the threshold, the process proceeds to the end, if not, the process proceeds to step s25.

Figure 5:
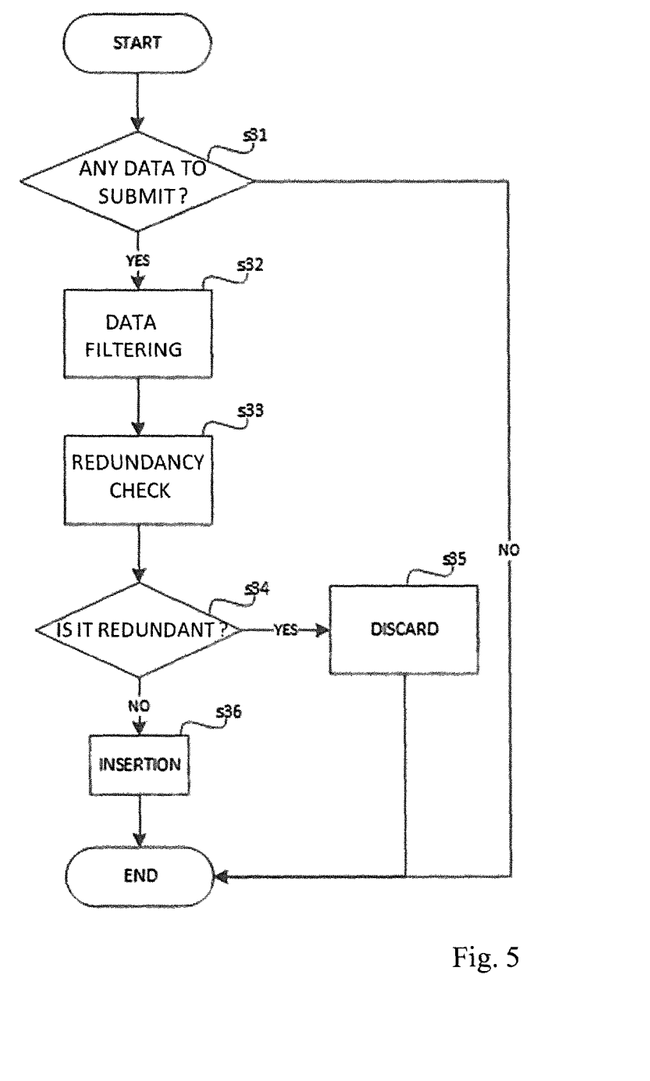
FIG. 5 shows a schematic flowchart diagram of information collection from at least one vehicle according to an embodiment of the invention.

FIG. 5 shows a schematic flowchart diagram of information collection from at least one vehicle according to an embodiment of the invention. As mentioned before, the storage 126 stores the information collected by a variety of onboard sensors (not shown) embedded in vehicle 5, for example, the GPS unit, geomagnetic sensor and gyroscope. Once the vehicle 5 is connected to the infrastructure, the server 3 can acquire these information for performing further analysis and service.

In step s31, a request is sent determining whether the vehicle 5 has any information to submit. The control unit 12*a* of vehicle wireless communication device 12 queries the storage 126 to response the request. If there is some information to submit, the process proceeds to s32, if not, the process proceeds to the end.

In s32, the server 3 performs data filtering/cleaning. The filtering/cleaning may comprise to fill in missing values, smooth noisy data, identify or remove outliers, and resolve inconsistencies.

Following that, in step s33, the server 3 executes a redundancy check in the base station database 4.

In step s34, it is determined whether there is any redundant information. If the information is redundant, the process proceeds to step s35, which discards such redundant information. If the information is not redundant, the server 3 performs step s36 and inserts the information into the base station database 4.

Figure 6:
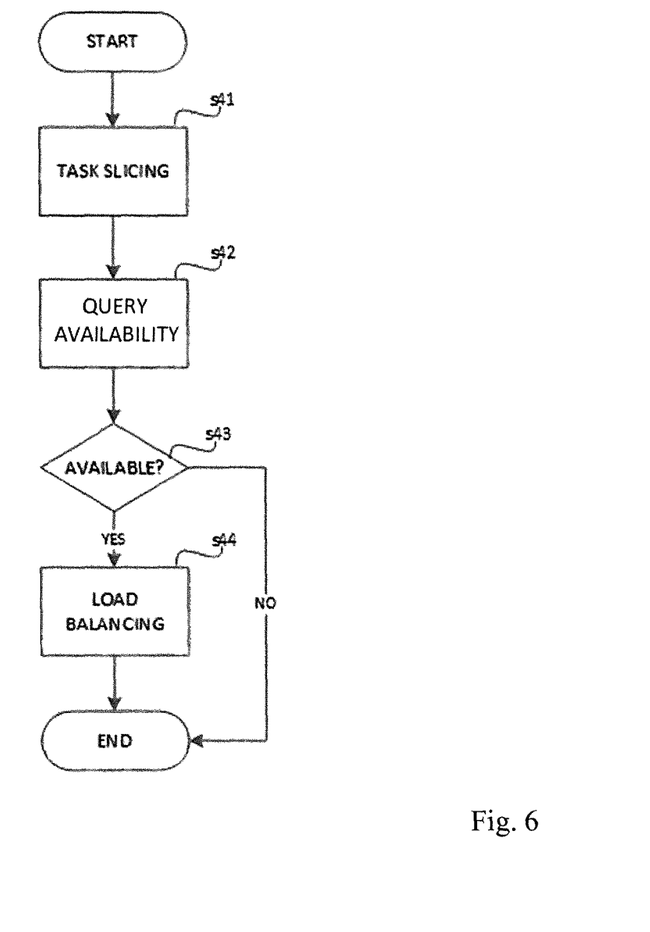
FIG. 6 shows a schematic flowchart diagram of task dispatching mechanism of a system and/or method according to an embodiment of the invention.

FIG. 6 shows a schematic flowchart diagram of task dispatching mechanism of a system and/or method according to an embodiment of the invention.

In step s41, the server 3 slices/divides a task into multiple sub-tasks. For example, when the system gets a request to construct a map with latest traffic condition of the city, it can first partition the map into multiple sub-maps. Then, the server 3 defines/creates the sub-tasks simultaneously. After that, the process proceeds to step s42. In step s42, the server 3 sends a query to at least one vehicle communication device 12 to ask whether the respective computation module 124 is available for one or more tasks or sub-tasks.

In step s43 it is determined whether the computation module 124 is available for one or more tasks or sub-tasks. If the computation module 124 of vehicle wireless communication device 12 is open for one or more tasks (step s43, YES), the process proceeds to step s44, if not (step s43, NO), the process proceed to the end.

In step s44, the server 3 launches at least one load-balancing mechanism to distribute the tasks/sub-tasks to the vehicles 5. Load-balancing mechanism, in general, is designed to minimize the total execution time of a single application running in parallel on a multicomputer system. The load balancing can use the communication facilities for support remote job execution in a user-transparent way to improve source utilization and response time. A decision to load-balance a task is made when it is faster to execute remotely than execute locally.

Figure 7:
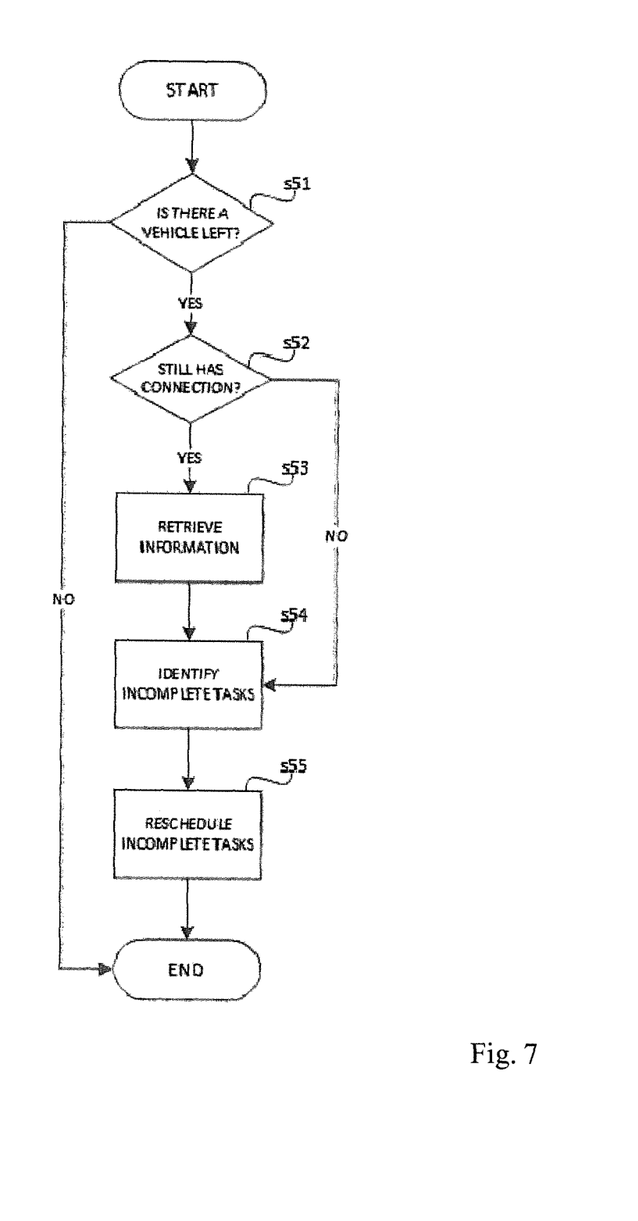
FIG. 7 shows a schematic flowchart diagram of a protocol for uncoupling the at least one vehicle when leaving according to an embodiment of the invention.

FIG. 7 shows a schematic flowchart diagram of a protocol for uncoupling the at least one vehicle when leaving according to an embodiment of the invention. In other words, FIG. 7 refers to a flowchart diagram illustrating a method to deal with when a vehicle 5 leaves the system according to an embodiment of the invention.

In step s51, it is determined whether there is any information acquired by the sensor 21 indicating a vehicle 5 is leaving a parking slot. For example, in one embodiment, the sensor 21 acquires information from the light detector. Based on a pre-determined input threshold, a sensor states information to the communication module 22. After it is determined that the light condition increases over the threshold, which indicates a vehicle 5 is just leaving the parking slot where the detector is located, the sensor 21 sends a notification message to communication module 22 and the process proceeds to step s52. Otherwise, the process proceeds to end.

In step s52, the process determines whether the vehicle 5 still has a connection with the infrastructure, i.e. the edge device 2 and the server 3. If the communication module 22 of the edge device 2 detects a respective signal of the vehicle 5, the process proceeds to s53. If there is no response from the vehicle 5 for a certain interval, the communication module 22 sends a notification to the server 3 that the system has lost the connection with the vehicle 5. Then the process proceeds to s54.

In step s53, the server 3 retrieves information from the leaving vehicle 5 until the server 3 loses connection with the leaving vehicle. The information may comprise information related to tasks that are distributed to this vehicle 5, the data stored in the vehicle 5, and log files, etc.

After that, in step s54, incomplete assignments of the left vehicle 5 are identified. After having identified what tasks the left vehicles 5 has not finished, the process reschedules these assignments to other vehicles 5 by performing load balance methods.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for utilizing computing and/or storage resources of at least one parked vehicle performing at least a portion of a task, the method comprising:
   recognizing a presence of at least one parked vehicle;
   establishing a network connection between at least one vehicle processor of the at least one parked vehicle and at least one serer;
   collecting information from the at least one parked vehicle, the collected information including at least one of a current computational capacity and a current storage capacity of the at least one parked vehicle;
   dividing the task into a plurality of sub-tasks, wherein each subtask includes at least one of a computational task and a storing task;
   dispatching at least one task of the plurality of subtasks to the at least one vehicle processor based on the at least one of the current computational capacity and the current storage capacity of the at least one parked vehicle; and
   performing, by the at least one vehicle processor of the at least one parked vehicle, the at least on dispatched subtask.

2. The method according to claim 1, further comprising:
   obtaining a result of performing the at least one dispatched subtask from the at least one vehicle processor.

3. The method according to claim 1, further comprising:
   recognizing when the at least one parked vehicle is leaving its parking position; and
   retrieving the result of performing the at least one dispatched subtask from the at least one vehicle processor before the at least one parked vehicle leaves its parking position.

4. The method according to claim 1, further comprising:
   determining whether the at least one dispatched subtask is completely performed by the at least one vehicle processor; and
   redispatching an uncompleted portion of the at least one dispatched subtask to at least one other vehicle processor of another vehicle when it is determined that the at least one dispatched subtask is not completely performed by the at least one vehicle processor, or
   redispatching the at least one dispatched subtask to at least one other vehicle processor of another vehicle when it is determined that the at least one dispatched subtask is not performed from the at least one vehicle processor and/or is not retrieved from the at least one vehicle processor.

5. The method according to claim 1, further comprising:
   authenticating the at least one parked vehicle and/or establishing a secure session for data transfer between the at least one parked vehicle and the at least one server.

6. The method according to claim 1, wherein the presence of the at least one parked vehicle is recognized by sensing whether the parked vehicle is parked at a parking position.

7. A method for providing computing and/or storage resources of at least one parked vehicle for the performance of at least a portion of a task, the method comprising:
   providing information from the at least one parked vehicle to at least one server, via a network connection between at least one vehicle processor of the at least one parked vehicle and the at least one server, the information including at least one of a current computational capacity and a current storage capacity of the at least one parked vehicle;
   receiving, by the at least one vehicle processor, at least one dispatched subtask from the at least one server, wherein the at least one dispatched subtask is produced as a result of dividing, by the at least one server, the task into a plurality of sub-tasks, wherein the at least one dispatched subtask includes at least one of a computational task and a storing task, and wherein the at least one dispatched subtask is dispatched based on the at least one of the current computational capacity and the current storage capacity of the at least one parked vehicle; and
   performing, by the at least one vehicle processor, the at least one dispatched subtask received from the at least one vehicle server.

8. The method according to claim 7, further comprising:
   sending the information including at least one of the current computational capacity and the current storage capacity of the at least one parked vehicle to at least one external edge device including a processor and one or more sensors.

9. The method according to claim 7, further comprising:
   sending authenticating information on the at least one parked vehicle to at least one external edge device including a processor and one or more sensors.

10. The method according to claim 1, wherein the collected information further includes at least one of:

information gathered by the at least one vehicle along its trajectory, the gathered information including traffic conditions, weather conditions and/or information on emergencies, information on a power status and/or a power consumption of the at least one vehicle, and information including data collected from at least one onboard sensor of the at least one vehicle.

11. A vehicle communication device for providing computing and/or storage resources of at least one parked vehicle performing of at least a portion of a task, the vehicle communication device comprising:

a controller configured to provide a network connection with at least one server, to receive at least one dispatched subtask from at least one edge device including an edge processor and one or more sensors, and to provide information from the at least one parked vehicle to the at least one edge device via the network connection, the information including at least one of a current computational capacity and a current storage capacity of the at least one parked vehicle, a processor configured to perform the at least one dispatched subtask received from the at least one edge device, and a memory configured to store the information to be provided to the at least one edge device, wherein the dispatched subtask is produced as a result of dividing, by the at least one server, the task into a plurality of sub-tasks, wherein the dispatched subtask includes at least one of a computational task and a storing task, and wherein the at least on dispatched subtask is dispatched based on the at least one of the current computational capacity and the current storage capacity of the at least one parked vehicle.

12. A system for utilizing computing and/or storage resources of at least one parked vehicle performing of at least a portion of a task, the system comprising:

an edge device including a processor and one or more sensors configured to recognize a presence of at least one parked vehicle, the edge device configured to establish a connection between at least one vehicle processor of the at least one parked vehicle and at least one other edge device including at least one other processor and one or more other sensors, the edge device being further configured to collect information from the at least one parked vehicle, the information including at least one of a current computational capacity and a current storage capacity of the at least one parked vehicle, and at least one server configured to divide the task into a plurality of sub-tasks, wherein each subtask includes at least one of a computational task and a storing task, dispatch at least one subtask to the at least one vehicle processor such that the at least one vehicle processor performs the at least one subtask, wherein the at least one dispatched subtask is dispatched based on the at least one of the current computational capacity and the current storage capacity of the at least one parked vehicle.

13. The system according to claim 12, wherein the edge device is further configured to recognize when the at least one parked vehicle is leaving its parking position and is configured to retrieve a result of performing the at least one dispatched subtask from the at least one vehicle processor before the at least one parked vehicle leaves its parking position.

14. The system according to claim 12, wherein the server is further configured to determine whether the at least one dispatched subtask is completely performed from the at least one vehicle communication device, and to redispatch an uncompleted portion of the at least one dispatched subtask to at least one other vehicle communication device in case that it is determined that the at least one dispatched subtask is not completely performed from the at least one vehicle processor, or is further configured to redispatch the at least one dispatched subtask to at least one other vehicle processor of another vehicle in case that it is determined that the at least one dispatched subtask is not performed from the at least one vehicle processor and/or is not retrieved from the at least one vehicle processor.

15. The system according to claim 12, wherein the one or more sensors of the edge device are configured to recognize the presence of at least one parked vehicle by sensing whether the parked vehicle is parked on a parking position and/or by obtaining a presence signal of the at least one parked vehicle.

16. The method according to claim 1, wherein establishing the network connection between the at least one vehicle processor of the at least one parked vehicle and the at least one server is performed via at least one external edge device including a processor and one or more sensors.

17. The method according to claim 7, wherein providing the information from the at least one parked vehicle to the at least one server is performed via at least one external edge device including a processor and one or more sensors.

18. The method according to claim 1, wherein the task is constructing a map with latest traffic conditions of city,
wherein dividing, by the at least one server, the task into a plurality of sub-tasks comprises partitioning the map into a plurality of sup-maps,
wherein the at least one sub-task is constructing a sup-map with the latest traffic conditions of a partition of the city.

19. The vehicle communication device according to claim 11, wherein the task is constructing a map with latest traffic conditions of city,
wherein dividing, by the at least one server, the task into a plurality of sub-tasks comprises partitioning the map into a plurality of sup-maps,
wherein the at least one sub-task is constructing a sup-map with the latest traffic conditions of a partition of the city.

20. The system according to claim 12, wherein the task is constructing a map with latest traffic conditions of city,
wherein dividing, by the at least one server, the task into a plurality of sub-tasks comprises partitioning the map into a plurality of sup-maps,
wherein the at least one sub-task is constructing a sup-map with the latest traffic conditions of a partition of the city.

* * * * *